March 22, 1932.   M. CASTRICUM   1,850,223

METHOD OF TESTING TIRES

Filed Oct. 31, 1929

INVENTOR.
Martin Castricum.
BY
ATTORNEY.

Patented Mar. 22, 1932

1,850,223

UNITED STATES PATENT OFFICE

MARTIN CASTRICUM, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

METHOD OF TESTING TIRES

Application filed October 31, 1929. Serial No. 403,755.

My invention pertains to a method of testing or analyzing pneumatic tires and more particularly to a method of substantially determining the action of the casing and the material used in its construction when under operating conditions.

The materials of a tire casing are under varying strains during the use of the tire under operating condtions. These strains affect especially the condition of the cord or fabric material used in the carcass of the tire, this material changing in length by being stretched or compressed as the tire is flexed in rolling under load. Changes in arrangement and position of the cords and other elements may also take place. Prior to my invention the action of the cord or fabric material, as well as the other elements of the casing, has never been known with any degree of accuracy although a major factor in determining the kind of materials to use and their arrangement.

In the drawings which show one embodiment of my invention,

In carrying out my method for one type of analysis, a casing 10 is built, the cords in the various plies of the casing being measured and their position recorded as the plies are applied. The casing is then cured in a regular tire mold.

Figure 1:
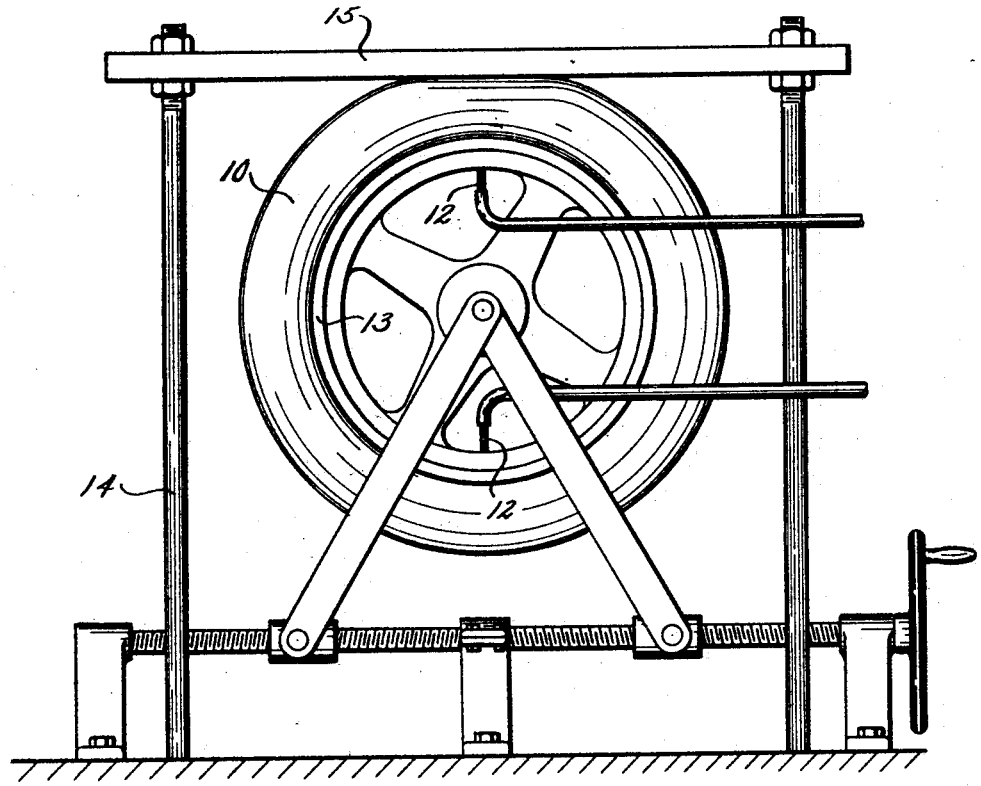
Fig. 1 is a side elevation of a deflection machine showing a tire being deflected a predetermined amount.
Figure 2:
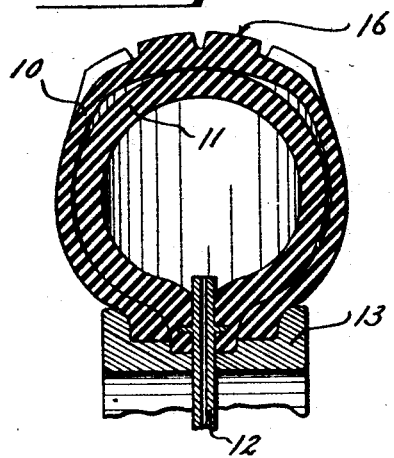
Fig. 2 is a cross section of a tire, airbag, and rim preparatory to being placed on the machine.
Figure 3:
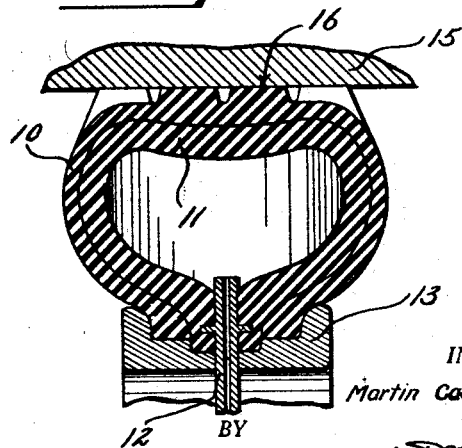
Fig. 3 is a similar view taken through the deflected portion of the tire shown in Fig. 1.

A tube 11, made of a composition resulting in a relatively hard rubber substance capable of retaining a fixed shape when completely cured, is then constructed having a pair of inlet stems 12. This tube is then partially cured in a suitable mold, the degree of cure being such as to obviate flow of the rubber under subsequent curing but leaving the tube flexible and expansible. Upon its removal from the mold the tube is buffed, coated with a rubber cement and placed within the cured casing 10, the inside of this casing having also been buffed and coated with rubber cement. The casing 10 and tube 11 are now assembled on a rim 13 (Fig. 2) and the whole placed on a deflection machine 14. Fluid pressure, preferably steam, is applied to the inside of the tube, the pressure being regulated as desired, this steam pressure being used to finish the curing of the partially cured tube as well as to inflate the tire 10. Upon getting the desired pressure within the tube 11 enough pressure is exerted by the deflection machine 14 to distort the tire 10 against a platen 15 on the machine to a deflection substantially equal to the deflection encountered by the tire in the service condition under investigation (Figs. 1 and 3).

After the tube 11 has been completely cured it is preferably cooled before being disturbed. This cooling is preferably accomplished by filling the tube with cold water at substantially the same pressure as the steam. This water may later be driven out of the tube by air.

Upon removing the casing and tube from the rim they will be found to be substantially one integral unit. The tube 11, due to its composition, will take a permanent set, thus fixing the tire itself in the distorted position. While I have described the application of the vulcanizable material in the form of a tube its application in any other suitable form would be within the scope of my invention.

Starting at the tread portion 16, the tire may now be stripped ply by ply and element by element, each ply and element, before its removal, being checked with the measurements and positions taken during the construction of the tire. In this way an accurate comparison may be made between the cords and elements not under strain and the same cords and elements in actual use. A comparison may also be made between the cords and elements at the section of the tire under deflection and the cords and elements only under strain of inflation and at intermediate points.

It will be understood that the effect of abnormal as well as normal tire conditions may be analyzed by my method, such, for example, as under-inflation, off-center loading, etc.

The method is, of course, also applicable to the study of tire profiles under various conditions which do not involve the dissecting of the tire.

Having thus described my invention, I claim:

1. The method of ascertaining the action of tire casings under distortion which comprises, applying a vulcanizable material to the interior of a casing of known construction, distorting the casing, vulcanizing the said material while the casing is distorted to thereby hold the casing in distorted position, and dissecting the casing.

2. The method of ascertaining the action of tire casings under distortion which comprises, securing a vulcanizable tube to the interior of a casing of known construction, distorting the casing and tube, supplying a vulcanizing fluid to the tube while the casing and tube are distorted to vulcanize the tube and thereby hold the casing in distorted position, and dissecting the casing.

3. The method of ascertaining the action of tire casings under distortion which comprises, securing a vulcanizable tube to the interior of the casing, distorting the casing and tube while circulating a heating fluid through the tube under pressure to vulcanize the tube and thereby hold the casing in its distorted condition, and dissecting the casing.

4. The method of ascertaining the action of tire casings which comprises, constructing the casing with known positions and dimensions of the casing elements, distorting the casing, fixing the casing as distorted, stripping the material from the casing ply by ply, examining the material of each exposed ply previous to its being stripped and comparing the results with the known original condition of the ply.

5. The method of preparing a tire casing for analysis which comprises, applying a vulcanizable material to the interior of the casing, distorting the casing and vulcanizing the material to fix the casing in its distorted condition.

6. The method of preparing a tire casing for analysis which comprises, securing a vulcanizable tube to the interior of the casing, distorting the casing and tube and supplying a vulcanizing fluid to the tube while the casing and tube are distorted to vulcanize the tube and thereby hold the casing in distorted condition.

7. The method of preparing a tire casing for analysis which comprises, securing a vulcanizable tube to the interior of the casing and subjecting the casing and tube to a predetermined load while circulating a heating fluid through the tube under a predetermined pressure to vulcanize the tube and thereby hold the casing in the condition imposed by the load.

MARTIN CASTRICUM.